United States Patent
Allen et al.

(10) Patent No.: US 7,453,454 B2
(45) Date of Patent: Nov. 18, 2008

(54) IMAGE DISPLAY SYSTEM AND METHOD

(75) Inventors: William J. Allen, Corvallis, OR (US);
James R Cole, Corvallis, OR (US);
Steven L. Harper, Corvallis, OR (US);
Karsten N. Wilson, Corvallis, OR (US);
Scott A Lerner, Corvallis, OR (US);
Anurag Gupta, Corvallis, OR (US); Jon A. Brewster, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 213 days.

(21) Appl. No.: 11/259,453

(22) Filed: Oct. 26, 2005

(65) Prior Publication Data

US 2007/0091118 A1    Apr. 26, 2007

(51) Int. Cl.
*G06T 15/00* (2006.01)
(52) U.S. Cl. .................. 345/418; 382/254; 348/603; 348/806
(58) Field of Classification Search ................ 345/418; 382/254–275; 348/603, 806
See application file for complete search history.

(56) References Cited

U.S. PATENT DOCUMENTS

| | | | |
|---|---|---|---|
| 6,044,172 A | 3/2000 | Allen | 382/66 |
| 6,219,451 B1 | 4/2001 | Hunt et al. | 382/214 |
| 6,232,954 B1 | 5/2001 | Rozzi | 345/601 |
| 6,243,070 B1 * | 6/2001 | Hill et al. | 345/589 |
| 6,285,397 B1 | 9/2001 | Webb et al. | 348/189 |
| 6,305,805 B1 | 10/2001 | Liebenow | 353/69 |
| 6,456,340 B1 | 9/2002 | Margulis | 348/745 |
| 6,590,606 B1 | 7/2003 | Hiller et al. | 348/203 |
| 7,212,657 B2 * | 5/2007 | Simon et al. | 382/118 |
| 2002/0190920 A1 | 12/2002 | Kung | 345/3.1 |
| 2003/0002748 A1 | 1/2003 | Funahashi | 382/274 |
| 2003/0007098 A1 | 1/2003 | Wada | 348/603 |
| 2003/0080698 A1 | 5/2003 | Ijzerman et al. | 348/603 |
| 2003/0122843 A1 | 7/2003 | Lai et al. | 345/589 |
| 2003/0206193 A1 | 11/2003 | Sato et al. | 715/736 |
| 2004/0150797 A1 | 8/2004 | Rieche et al. | 348/E5.137 |
| 2004/0205505 A1 | 10/2004 | Vans et al. | 715/501.1 |
| 2005/0024383 A1 | 2/2005 | D'Souza et al. | 345/601 |
| 2005/0062755 A1 | 3/2005 | Van Dyke et al. | 345/600 |
| 2005/0062897 A1 | 3/2005 | Lei | 348/806 |

FOREIGN PATENT DOCUMENTS

| | | |
|---|---|---|
| EP | 1 347 652 A2 | 9/2003 |
| EP | 1 465 437 A | 10/2004 |
| JP | 10276349 | 10/1998 |
| JP | 2004/023741 A | 1/2004 |
| JP | 2004-240606 A | 8/2004 |

* cited by examiner

*Primary Examiner*—Phu K Nguyen (57) ABSTRACT

A display system includes a display device and a data processing module. The display device is configured to display an image and has a processing profile associated therewith. The data processing module is remote from and operatively coupled to the display device and is configured to receive input image data for the image to be displayed and generate processed image data from the input image data based on the processing profile of the display device.

30 Claims, 4 Drawing Sheets

IMAGE DISPLAY SYSTEM AND METHOD

BACKGROUND

Digital projectors typically include an illumination system, some type of spatial light modulator (SLM), and a projection lens. The illumination system generally includes a light source which generates light and a reflector which directs the light from the light source to the SLM. The SLM forms an image beam by modulating the light, either via reflection (e.g. a digital micro-mirror device (DMD)) or transmission (e.g. a liquid crystal modulator), based on image data representative of a desired image to be projected.

The projection lens receives and projects the image beam onto a surface, such as a projection screen, for viewing of the desired image. The projection lens is typically designed to provide a desired magnification, or range of magnifications (i.e. zoom lens) and to minimize optical aberrations (such as chromatic aberrations, lateral color, coma, diffraction, and distortion, for example) in order to provide a high quality projected image. In efforts to minimize such aberrations, projection lenses typically comprise complex systems of multiple lens elements arranged in a particular sequence. Such projection lenses are costly and consume a relatively large amount of space within the projector.

To ease tolerance requirements and thereby simplify projection lens design, some DMD projectors include on-board processing to pre-correct image data to compensate for certain optical aberrations and projection distortions (such as keystone distortion, for example). However, real time pre-correction of such distortion requires significant and costly on-board signal processing capabilities.

SUMMARY

One form of the present invention provides a display system including a display device and a data processing module. The display device is configured to display an image and has a processing profile associated therewith. The data processing module is remote from and operatively coupled to the display device and is configured to receive input image data for the image to be displayed and generate processed image data from the input image data based on the processing profile of the display device.

DETAILED DESCRIPTION

In the following detailed description of the preferred embodiments, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
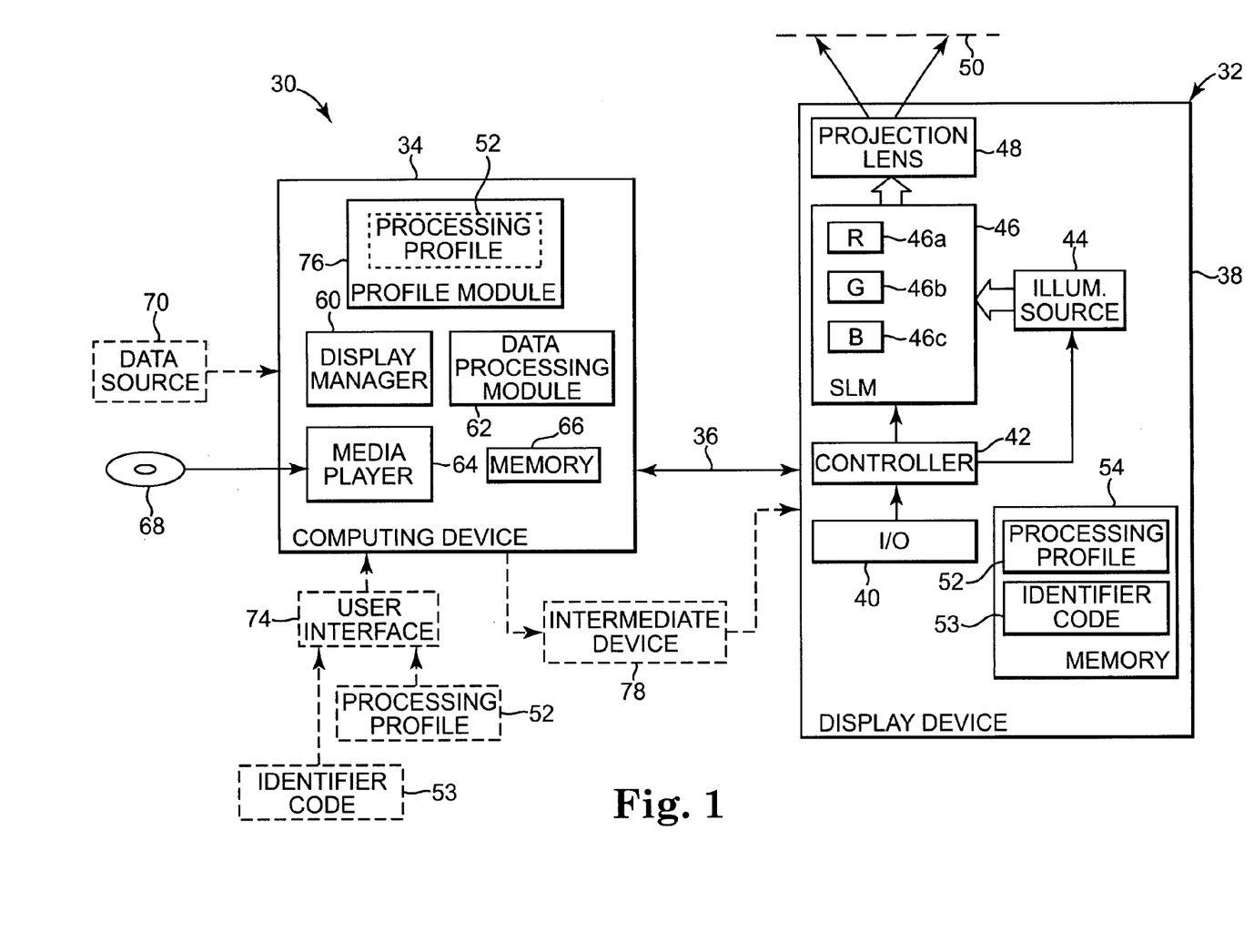
FIG. 1 is a block diagram illustrating one embodiment a display system employing data pre-processing according to embodiments of the present invention.

FIG. 1 illustrates one embodiment of a display system 30 according to the present invention employing display device specific pre-processing of image data upstream of a display device so as to reduce internal signal processing and optical requirements of the display device. In one embodiment, display system 30 includes a display device 32 and a computing device 34. In one embodiment, computing device 34 is remote from and coupled to display device 32 via an interface 36. Interface 36 may comprise a universal serial bus (USB), an IEEE Standard 1394 compliant external bus connection (e.g. FireWire®), or other suitable interface.

Display device 32 is configured to display an image based on image data. As will be described in greater detail below, display device 32 has an associated processing profile indicative of off-board processing to be performed to pre-correct or adjust the image data to correspond to operational and display characteristics of display device 32.

In one embodiment, display device 32 is a digital projector 38. As illustrated in the embodiment of FIG. 1, digital projector 38 includes an input/output (I/O) module 40, a controller 42, an illumination source 44, a spatial light modulator (SLM) 46, and a projection lens 48.

In one embodiment, I/O module 40 receives/transmits data from/to external devices, such as image data from computing device 34 via interface 36. In addition, controller 42 receives the image data from I/O module 40 and performs various processes to prepare the image data for display such as, for example, separating the image data into appropriate color components (e.g. red, green, and blue (RGB) components) and sequencing the data for projection. Controller 42 may also be configured to synchronize operation of illumination source 44 with SLM 46.

In one embodiment, illumination source 44 generates and directs an illumination beam onto SLM 46 so as to uniformly illuminate SLM 46. Illumination source 44 may include an ultra high pressure mercury lamp, xenon lamp, metal halide lamp, or other suitable projector lamp that provides a monochromatic or polychromatic illumination beam. In one embodiment, illumination source 44 includes light emitting diodes (LEDs) configured to provide separate color components (e.g. red, green, blue (RGB) components). In one embodiment, illumination source 44 may comprise a rotating filter wheel architecture, as generally known to those skilled in the art, for providing a temporal sequence of color components.

In one embodiment, SLM 46 receives and modulates the illumination beam based on image data received from controller 42 to form an image beam which is directed to projection lens 48. SLM 46 includes at least one SLM, such as a transmissive type modulator (e.g. liquid crystal display (LCD)), a reflective type modulator (e.g. digital micro-mirror device (DMD)), or other suitable SLM which transmits or reflects light. In one embodiment, where the illumination beam includes separate RGB illumination components, SLM 46 includes separate SLMs 46a, 46b, and 46c each positioned to receive and modulate a different one of the RGB illumination components.

In one embodiment, projection lens 48 receives, magnifies, and relays an image of SLM 46 (i.e. the image beam) onto a projection surface 50, such as a projection screen, for viewing. Projection lens 48 may comprise one or more lens elements including a plurality of refractive and/or reflective surfaces configured to provide desired magnification, lateral color, and distortion requirements. In one embodiment, projection lens 48 is configured to provide a fixed magnification.

In accordance with the present invention, and as mentioned above, digital projector 38 has an associated processing profile 52 which is indicative of off-board processing to be performed to pre-correct or adjust the image data prior to projection by digital projector 38. In one embodiment, processing profile 52 is stored in a memory 54 of digital projector 38.

In one embodiment, processing profile 52 includes one or more processing parameters indicative of one or more pre-determined processing algorithms and/or one or more parameters to be employed as coefficients for such processing algorithms. As will be described in greater detail below, various types of such processing algorithms are known to those skilled in the art and may be employed for various purposes such as image sharpening and de-noising filters. In one embodiment, processing profile 52 includes actual processing algorithms in the form of computer executable code.

In one embodiment, processing profile 52 includes a performance profile representative of operational and display characteristics of digital projector 38. In one embodiment, the performance profile includes an "optical profile" representative of the optical characteristics of digital projector 38. For example, the projected image of SLM 46 relayed to projection surface 50 by projection lens 48 may include some abnormalities that cause the projected image to deviate from what would otherwise be considered an "ideal" image. These deviations are generally referred to as image or lens aberrations. Such lens aberrations include, for example, chromatic aberration, coma, spherical aberration, lateral color, and distortion (such as pincushion and barrel distortion, for example).

In one embodiment, the optical profile includes a mapping or distortion operator that characterizes the distortion of the projected image and provides a correction factor (e.g. a two-dimensional displacement vector) for each pixel or groups of pixels to adjust the image data so as to substantially reduce such distortion. Additionally, the projected image may have a non-uniform brightness and/or non-linearities introduced by SLM 46 and/or other optical elements. As such, in one embodiment, the optical profile includes a luminance profile configured to adjust the luminance values of the image data so as to provide uniform image brightness.

In one embodiment, the performance profile includes an "imager profile" representative of characteristics and attributes of SLM 46. For example, SLM 46 has a resolution (e.g. 640×480, 800×600, 1024×728, etc.) and a bit-depth (e.g. 8-bit) indicating the per-channel color depth supported by SLM 46. When SLM 46 is a DMD-type modulator, for example, the resolution indicates the number of individual micro-mirrors and the aspect ratio of the micro-mirror array, with the bit-depth representative of a modulation rate of the individual micro-mirrors. As such, in one embodiment, the imager profile may include a scaling algorithm configured to scale or resize the input image data to fit the resolution of SLM 46 and maintain a desired aspect ratio of the input image. In one embodiment, the imager profile includes a dithering algorithm configured to adjust the bit-depth of the input image data based on the available bit depth of SLM 46.

In one embodiment, the performance profile includes a "color profile" associated with digital projector 38 which describes the projected brightness response of each of the color channels as a function of the received image data. In one embodiment, the color profile includes a look-up table. In one embodiment, the color profile includes a color profile in accordance with the International Color Consortium (ICC) profile specification. As such, the color profile is configured to enable translation of the colors of the input image data to the color space of digital projector 38.

In one embodiment, the performance profile includes a "data handling profile" which describes the data handling and communications protocol employed by I/O module 40 of digital projector 38 to establish and carryout communications and data transfers with external devices, such as computing device 34. Such communication protocols are known to those of ordinary skill in the art and specify data handling attributes such as, for example, hand-shaking protocols, transfer rates, error detection, and error correction (if employed).

Collectively, the above described optical, imager, color, and data handling profiles comprise the performance profile of digital projector 38. It is noted that the performance profile, is not limited to the above described characteristics and may describe additional operational attributes associated with digital projector 38 such as sharpening, smoothing, and noise filtering, for example.

Although described individually above, it is noted that processing profile 52 may comprise any combination of the above described processing parameters, algorithms, and performance profiles. It is further noted that processing profile 52 is not limited to the above descriptions, and may include any information or comprise any format that conveys or describes the off-board processing to be performed on the image data. In one embodiment, processing profile 52 is unique to digital projector 38. In one embodiment, processing profile 52 is common to a group/family of similar display devices to which digital projector 38 belongs, such as a particular model or class of digital projector. In one embodiment, processing profile 52 of digital projector 38 is determined at manufacture, with measurement techniques to determine image characteristics such as distortion, luminance uniformity, and brightness being commonly known to those skilled in the art.

Although described primarily with respect to digital projector 38, display device 32 may comprise other projector-type display devices, direct-view type display devices such as liquid crystal display (LCD) panels, cathode ray tube (CRT) based display devices, hand-held display devices (e.g. mobile telephones and iPods®), or any other suitable display device. The processing profiles associated with such devices include corresponding operational and display characteristics. For example, while a processing profile associated with an LCD panel may not include distortion characteristics, it may include a characterization of the rise/fall times of the LCD pixels.

In one embodiment, as illustrated in FIG. 1, computing device 34 includes a display manager 60, a data processing module 62, a media player 64, and a memory 66. Computing device 34 may comprise a personal computer (PC), laptop computer, notebook computer, or other suitable computing device. In one embodiment, media player 64 receives input image data for an image which is desired to be displayed by digital projector 38 via one or more discs 68 or other media inserted into media player 64 by a user of display system 30. Disc 68 may comprise a digital video disc (DVD), a compact disk (CD) (e.g. CD-ROM, CD-R, CD-RW, and CD+RW), or other disc configured to store image data. The input image data may be in various formats such as DVD, JPEG, QuickTime, RealVideo, and Windows Media. Media player 64 reads and provides the input image data from disc 68 to display manager 60.

In one embodiment, display manager 60 receives the input image data from media player 64 or from another suitable data source 70 (e.g. a portable DVD player or a television signal), and provides the input image data to data processing module 62. In one embodiment, data processing module 62 generates processed or pre-corrected image data from the input image data based on processing profile 52, such that the processed image data is adjusted to the specific operating characteristics of digital projector 38. In one embodiment, data processing module 62 stores the processed image data in memory 66. In one embodiment, memory 66 includes a portion of data processing module 62. In one embodiment, data processing module 62 stores the processed image data in a memory within digital projector 38, such as memory 54.

In one embodiment, data processing module 62 includes a plurality of algorithms corresponding to digital projector 38 such that the algorithms are configured to pre-correct the input image data based on processing profile 52 of digital projector 38 to form the processed image data. Algorithms for adjustment/correction of digital image data for various purposes, such as distortion correction and noise filtering, for example, are commonly known to those skilled in the art.

In one embodiment, generating the processed image data includes scaling or warping the input image data so as to match the resolution of the processed image data with the resolution of digital projector 38 based on the imager profile of processing profile 52. In one embodiment, generating the processed image data includes adjusting the bit-depth of the input image data based on the imager profile such that the bit-depth of the processed image data corresponds to that of digital projector 38. In one embodiment, generating the processed image data includes pre-distorting the input image data based on the optical profile of processing profile 52 so that the processed image data counteracts or offsets the known distortion of digital projector 38.

In one embodiment, generating the processed image data includes adjusting the color of the input image data based on the color profile of processing profile 52 for digital projector 38. In one embodiment, generating the processed image data includes adjusting the brightness of the input image data based on the luminance profile or luminance operator of processing profile 52 for digital projector 38. In one embodiment, generating the processed image data includes formatting the image data according to the data handling profile of processing profile 52 for digital projector 38.

It is noted that data processing module 62 is not limited to processing the input image data based on the above described characteristics. Accordingly, data processing module 62 may be configured to pre-correct input image data based on any number of operational characteristics of digital projector 38 and may include any number of algorithms, such as enhancement-type algorithms configured to provide digital projector 38 with additional attributes such as noise reduction/filtering, image sharpening, error diffusion, and contrast enhancements, for example.

In one embodiment, as described above, processing profile 52 for digital projector 38 is stored in memory 54 digital projector 38. As such, in one embodiment, display manager 60 receives and provides processing profile 52 to data processing module 62 from memory 54 via interface 36. In one embodiment, data processing module 62 includes processing profile 52 for digital projector 38, and in one embodiment, a user of display system 30 provides processing profile 52 for digital projector 38 to display manager 60 via a user interface 74, such as a keyboard, for example.

In one embodiment, display system 30 includes a profile module 76 which includes processing profiles of a plurality of display devices, including processing profile 52 of digital projector 38. In addition, data processing module 62 includes a plurality of groups of one or more algorithms, with each group of algorithms corresponding to a different class of display devices, including a group of algorithms corresponding to digital projector 38.

In one embodiment, based on an identifier code 53 corresponding to digital projector 38, such as a serial number, model number, or other suitable identifying code, for example, profile module 76 selects the processing profile corresponding to digital projector 38 from the plurality of processing profiles and provides the selected processing profile to data processing module 62. In addition, data processing module 62 selects the group of algorithms corresponding to digital projector 38 from the plurality of algorithm groups based on identifier code 53 and generates the processed image data from the input image data based on the selected group of algorithms and the selected processing profile received from profile module 76.

In one embodiment, identifier code 53 is stored in memory 54 of digital projector 38. As such, in one embodiment, display manager 60 receives identifier code 53 of digital projector 38 from memory 54 via interface 36 and provides identifier code 53 to data processing module 62 and to profile module 76. In one embodiment, a user of display system 30 provides identifier code 53 of digital projector 38 to display manager 60 via user interface 74.

In one embodiment, after generation of the processed data by data processing module 62 and at a time directed by a user of display system 30, display manager 60 provides the processed image data as stored, for example, in memory 66 of computing device 34 to digital projector 38 via interface 36 for display. In one embodiment, display manager 60 provides the processed image data from memory 66 to an intermediate memory/computing device 78 which delivers the processed imaged data to digital projector 38 at a later time as directed by a user of display system 30.

In one embodiment, for example, intermediate device 78 may comprise a portable electronic device such as an ipod®. In one embodiment, a media such as a DVD may be provided with the processed image data and the processed image data may be delivered to digital projector 38 with a suitable intermediate memory/computing device, such as a laptop computer including a suitable media player, for example.

In one embodiment, data processing module 62 embeds identification or "tag" data (such as a serial number, model number, and/or class number, for example) indicating the specific digital projector 38 and/or specific model or class of digital projectors to which digital projector 38 belongs within the processed image data. As such, upon receiving the processed image data from display manager 60, controller 42 of digital projector 38 checks the tag data to determine whether the processed image data can be projected by digital projector 38.

For example, in one embodiment, wherein the tag data includes a serial number which matches a serial number of digital projector 38, controller 42 provides indication that the processed image data is specific to digital projector 38. In one embodiment, when the tag data matches a model/class to which digital projector 38 belongs but not the serial number of digital projector 38, controller 42 provides indication that digital projector 38 is able to display the processed image data although it may not result in an optimal image. In one embodiment, when the tag data does not correspond to any identifying code associated with digital projector 38, controller 42 provides indication that the processed image data cannot be displayed by digital projector 38. In one embodiment, controller 42 provides such indication by projecting a message onto projection surface 50 or causing a message to be displayed via a display or graphical user interface associated with computing device 34 or intermediate computing device 78.

In summary, by externally pre-processing and algorithmically adjusting the input image data to compensate for and match the specific operating characteristics of digital projector 38, digital projector 38 is able to project a high quality image on projection surface 50 without requiring extensive internal signal processing capabilities and/or a complex and expensive projection lens system. In addition, by pre-processing the image data (e.g. scaling, color adjusting, pre-distorting, etc.) external to digital projector 38 with a PC or other computing device already owned by or accessible to most users, the processing requirements of controller 42 may be reduced and the design/implementation of projection lens 48 may be simplified. As a result, the size, complexity, power consumption, and cost of digital projector 38 may be reduced relative to conventional digital projectors.

Additionally, since, in one embodiment, the pre-processing of the image data is non-real time, data processing module 62 can employ complex algorithms and processing techniques to improve the quality of the displayed image since use of such algorithms may not be possible in real time processing applications. Furthermore, as improved algorithms and processing techniques are developed over time, data processing module 62 can be readily upgraded, as described below.

Although described above in one embodiment as providing non-real time processing of the input image data, it is noted that in other embodiments of the present invention, data processing module 62 is configured to provide real time off-board processing of the input image data. In such embodiments, memory 66 of computing device 34 functions as a buffer when providing the processed image data to digital projector 38 for display.

Additionally, it is understood that functions performed by display manager 60, data processing module 62, and/or profile module 76 may be implemented in hardware, software, firmware, or any combination thereof. As such, the implementation may be via a microprocessor, programmable logic device, or state machine. In addition, components of the present invention may reside in software on one or more computer-readable mediums. The term computer-readable medium as used herein is defined to include any kind of memory, volatile or non-volatile, such as floppy disks, hard disks, CD-ROMs, flash memory, read-only memory, and random access memory.

Figure 2:
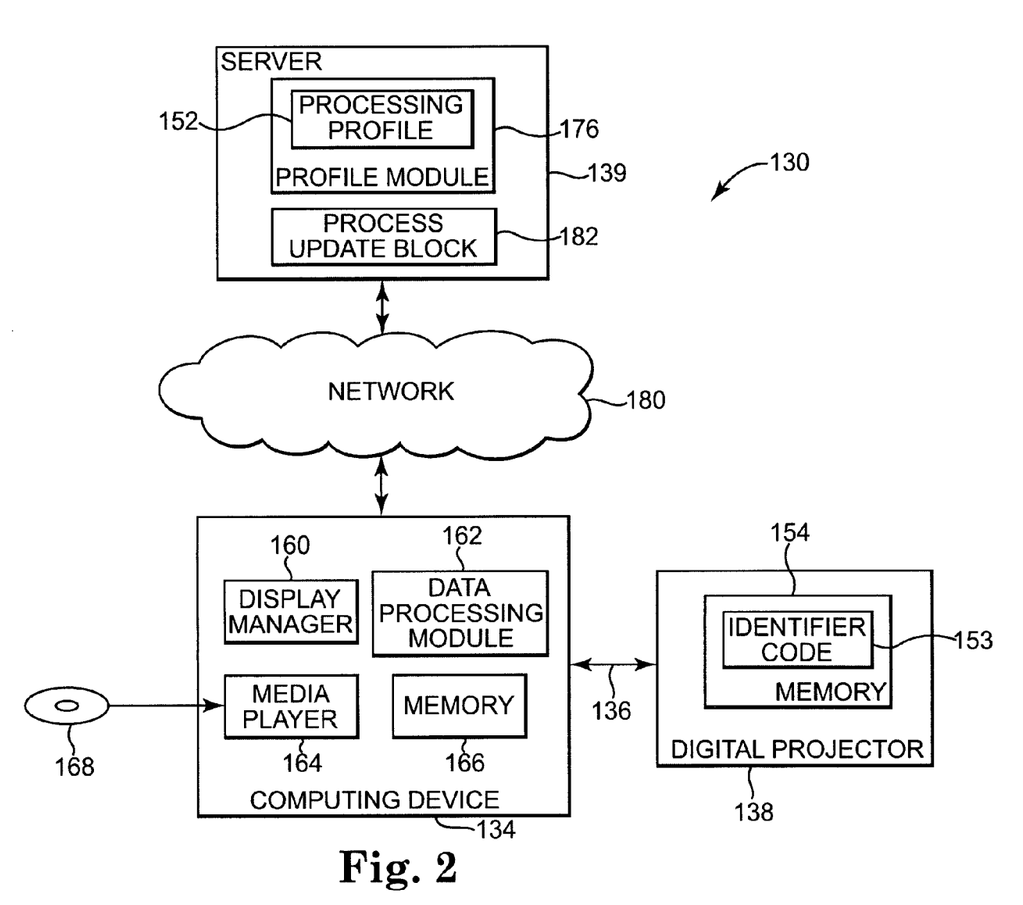
FIG. 2 is a block diagram illustrating one embodiment a display system employing data pre-processing according to embodiments of the present invention.

FIG. 2 is a block diagram illustrating one embodiment of a display system 130 according to the present invention. In one embodiment, display system 130 includes a computing device 134, an interface 136, a digital projector 138, and a computing device or server 139. In one embodiment, computing device 134 is similar to computing device 34 of FIG. 1 and includes a display manager 160, a data processing module 162, a media player 164, and a memory 166 each of which are similar respectively to display manager 60, data processing module 62, media player 64, and memory 66.

In one embodiment, digital projector 138 is similar to digital projector 38 of FIG. 1 and includes a memory 154. In addition, computing device 134 is coupled to digital projector 138 via an interface 136 in a manner similar to interface 36 of FIG. 1.

In one embodiment, server 139 includes a profile module 176 similar to profile module 76 of computing device 34 of FIG. 1. In one embodiment, server 139 includes a third party server, wherein server 139 and profile module 176 are maintained and operated by the third party. In one embodiment, the third party includes a manufacturer of digital projector 138.

In one embodiment, server 139 is remote from and coupled to computing device 134 via a communications network 180. In one exemplary embodiment, communications network 180 is an Internet-based communication network and may include local area networks, wide area networks, and private networks (e.g. Intranets). However, communications network 180 may comprise any suitable network or communications link which supports communications between parties located at respective computers or other suitable electronic devices.

In one embodiment, display manager 160 acquires an identifier code 153 corresponding to digital projector 138 (such as serial number and/or model number, for example) from memory 154 via interface 136. Display manager 160, in-turn, provides identifier code 153 for digital projector 138 to profile module 176 on server 139 via network 180.

In one embodiment, profile module 176 includes a plurality of processing profiles for various types, models, classes, and individual display devices, including a processing profile 152 associated with digital projector 138. In one embodiment, based on identifier code 153 for digital projector 138 received from display manager 160, profile module 176 selects processing profile 152 associated with digital projector 138 from the plurality of processing profiles and provides processing profile 152 to display manager 160 via network 180.

In one embodiment, media player 164 of computing device 134 reads and provides input image data from a disc 168 to display manager 160. As such, display manager 160 provides the input image data from media player 164, processing profile 152 from server 139, and identifier code 153 for digital projector 138 received from memory 154 to data processing module 162.

In one embodiment, similar to that described above with respect to FIG. 1, data processing module 162 includes a plurality of groups of processing algorithms, with each group corresponding to a different class of display devices. In one embodiment, based on identifier code 153 received from display manager 160, data processing module 162 selects the group of algorithms corresponding to the class of projectors to which digital projector 138 belongs.

In one embodiment, based on the selected group of algorithms and processing profile 152 received from remote server 139 via display manager 160, data processing module 162 generates processed image data which is pre-processed and adjusted to the unique characteristics of digital projector 138. In one embodiment, data processing module 162 stores the processed image data in memory 166. In one embodiment, at a user desired time after generation of the processed image data, display manager 160 provides the processed image data from memory 166 to digital projector 138 via interface 136 for viewing.

In one embodiment, server 139 includes a process update module or block 182. In one embodiment, process update block 182 includes a plurality of updated image data processing algorithms each associated with any number of display devices, including digital projector 138. In one embodiment, display manager 160 periodically updates data processing module 162 of computing device 134 with updated algorithms associated with digital projector 138 by downloading appropriate algorithms from process update block 182 via network 180. In one embodiment, the updated algorithms are identified based on identifier code 153 of digital projector 138.

In one embodiment, display manager 160 periodically updates an entire suite of algorithms of data processing module 162 by downloading updated algorithms from process update block 182 via network 180, wherein the suite of algorithms includes groups of algorithms, with each group of algorithms corresponding to one projection device and/or class of projection devices of a plurality of projection devices and/or classes of projection devices, including digital projector 138.

Figure 3:
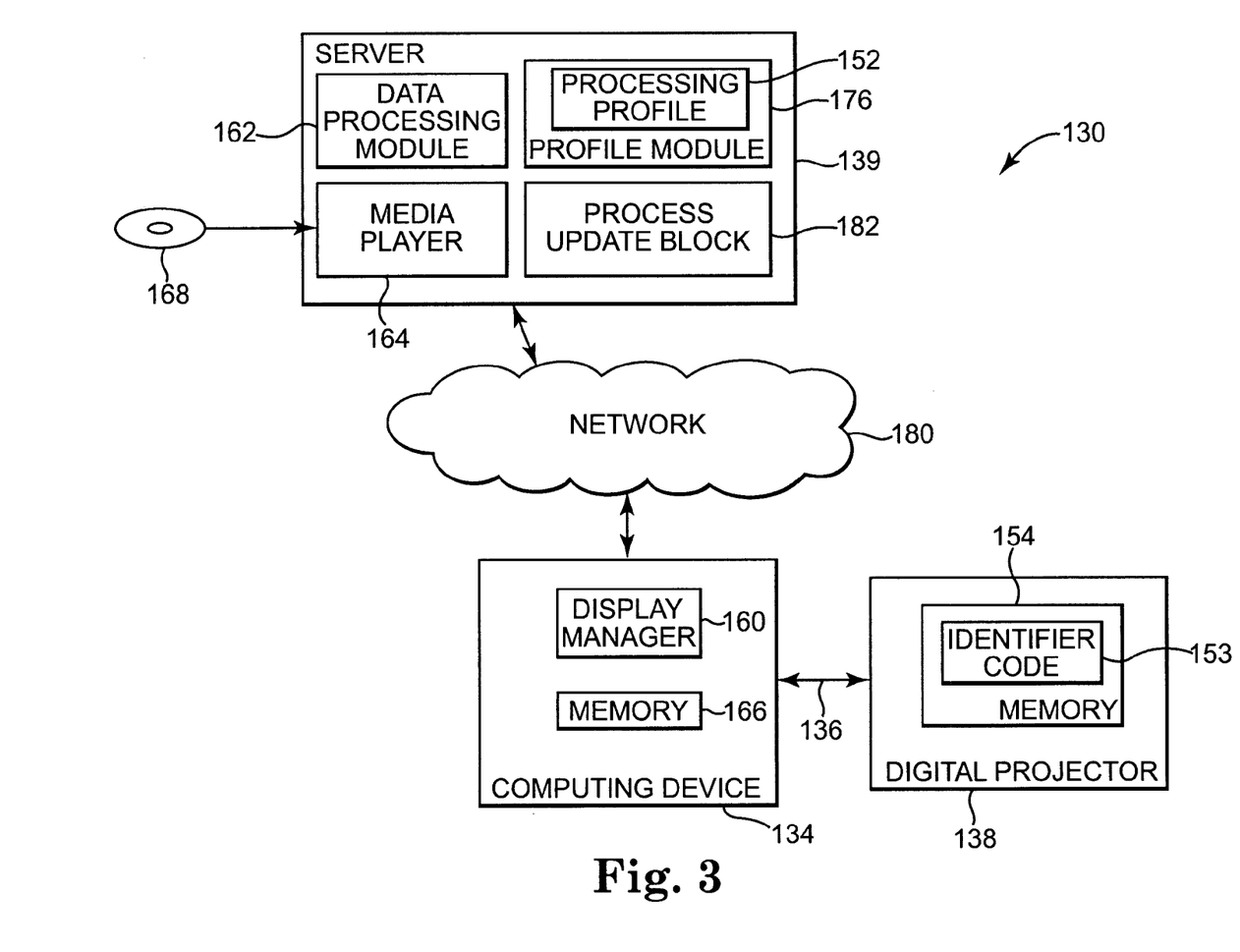
FIG. 3 is a block diagram illustrating one embodiment a display system employing data pre-processing according to embodiments of the present invention.

FIG. 3 is a block diagram illustrating one embodiment of a display system 130' according to the present invention. In one embodiment, display system 130' includes display manager 160, data processing module 162, media player 164, memory 166, profile module 176, and process update block 182 similar to display system 130 of FIG. 2. With display system 130', however, data processing module 162 and media player 164 reside on server 139 rather than computing device 134.

In one embodiment, a user of display system 130' contacts server 139 via display manager 160 and network 180 and requests particular image data such as image data for a specific movie, sporting event, television show, or the like. In making the request, display manager 160 provides an identifier code 153 associated with digital projector 138 (such as a serial number, model number, or class number, for example) to server 139 via network 180. In one embodiment, display manager 160 acquires identifier code 153 from memory 154 of digital projector 138.

In response, in one embodiment, a disc 168 containing the user requested input image data is provided to media player 164. Media player 164 reads the input image data from disk 164 and provides the input image data to data processing module 162. Additionally, based on identifier code 153 for digital projector 138, profile module 176 selects and provides processing profile 152 associated with digital projector 138 to data processing module 162. In response, data processing module 162 selects one or more algorithms corresponding to digital projector 138 and generates processed image data from the input image data, with the processed image data being pre-corrected specifically to the operating and display characteristics of digital projector 138.

In one embodiment, the processed image data is subsequently transferred to display manager 160 via network 180 and stored at memory 166. Subsequently, at a user desired time, display manager 160 provides the processed image data from memory 166 to digital projector 138 via interface 136 for viewing.

Figure 4:
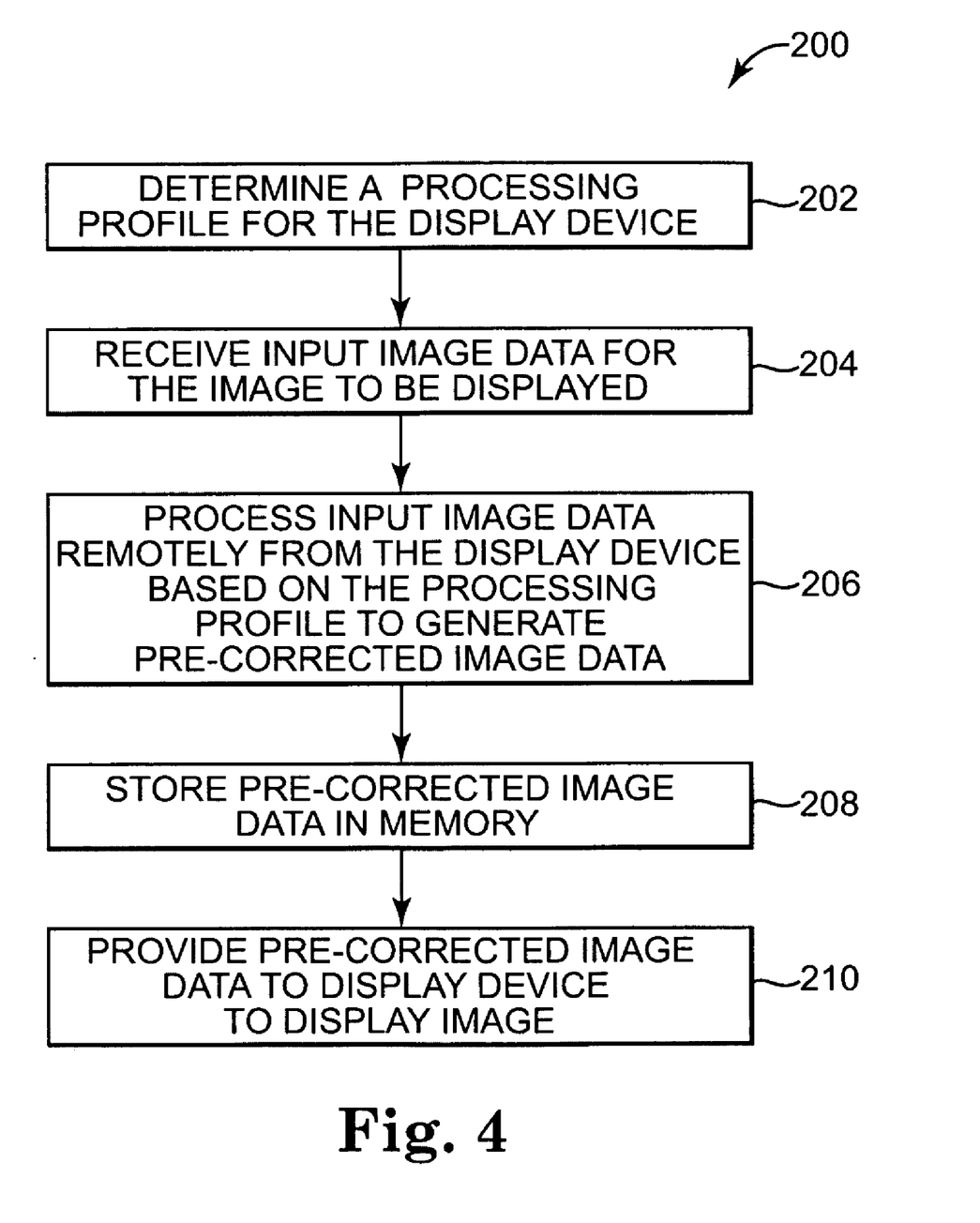
FIG. 4 is a flow diagram illustrating one embodiment of a method for displaying an image according to one embodiment of the present invention.

FIG. 4 is a flow diagram illustrating one embodiment of a method 200 for displaying an image on a display device according to the present invention. Method 200 begins at 202 where a processing profile is determined for the display device. In one embodiment, the processing profile is representative of various operational characteristics of the display device such as those described above. In one embodiment, the processing profile is determined at manufacture of the display device. In one embodiment, for example, the processing profile is stored in a memory internal to the display device, as illustrated and described above with reference to FIG. 1. In one embodiment, for example, the processing profile is available at a third party server location via the Internet, as illustrated and described above with reference to FIG. 2.

At 204, input image data for the image to be displayed is received. In one embodiment, for example, the input image data is received from a media such as a DVD 68 via a media player 64 as illustrated and described above with reference to FIG. 1.

At 206, the input image data is processed remotely from the display device based on the processing profile and one or more algorithms corresponding to the display device, so as to generate image data which is pre-corrected specifically to the characteristics of the display device. In one embodiment, for example, the input image data is processed using computing device 34 or 134 via data processing module 62 or 162, as illustrated and described above with reference to respective FIGS. 1 and 2. In one embodiment, for example, the input image data is processed at server 139 via data processing module 162, as illustrated and described above with reference to FIG. 3. In one embodiment, at 208, the processed or pre-corrected image data is stored in a memory, such as memory 66 or 166 (FIGS. 1-3).

At 210, the processed image data is provided to the display device for viewing. In one embodiment, the processed image data is transferred to the display device at a user selected time after generation of the processed image data. In one embodiment, the processed image data is provided to the display device on a real-time basis.

Although specific embodiments have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A display system, comprising:
    a display device configured to display an image, the display device having a processing profile associated therewith, the processing profile including optical characteristics, imager characteristics, color characteristics, and data handling characteristics of the display device; and
    a data processing module remote from and operatively coupled to the display device, the data processing module configured to receive input image data for the image to be displayed and generate processed image data from the input image data based on the processing profile of the display device.

2. The display system of claim 1, further comprising:
    a memory, wherein the data processing module is configured to store the processed image data in the memory for later display of the image by the display device.

3. The display system of claim 2, wherein the processed image data is provided from the memory to the display device at a selected time after generation of the processed image data is complete.

4. The display system of claim 2, wherein the memory comprises a portion of the display device.

5. The display system of claim 2, wherein the memory comprises a portion of a computing device remote from and operatively coupled to the display device.

6. The display system of claim 5, wherein the data processing module comprises a portion of the computing device.

7. The display system of claim 2, wherein the memory comprises a portion of a portable electronic device.

8. The display system of claim 1, wherein the data processing module is configured to generate and provide the processed image data to the display device on a real-time basis for display.

9. The display system of claim 1, wherein the display device includes a memory and the data processing module is configured to receive the processing profile from the memory of the display device.

10. The display system of claim 1, wherein the processing profile is unique to the display device.

11. The display system of claim 1, where the processing profile is associated with a class of display devices to which the display device belongs.

12. The display system of claim 1, wherein the data processing module includes a group of one or more algorithms corresponding to the display device and is configured to process the input image data based on the processing profile and the group of one or more algorithms to form the processed image data.

13. The display system of claim 1, wherein the data processing module includes a plurality of groups of one or more algorithms, each of the groups corresponding to a different class of display devices, wherein the data processing module is configured to receive an identifier code corresponding to the display device and, based on the identifier code, select and employ for generation of the processed image data one of the groups of algorithms corresponding to a class of display devices to which the display device belongs.

14. The display system of claim 1, further comprising:
a profile module having a plurality of processing profiles associated therewith, each of the processing profiles corresponding to a different class of display devices and one of the processing profiles including the processing profile of the display device,
wherein the profile module is configured to receive an identifier code corresponding to the display device and, based on the identifier code, select the processing profile corresponding to a class of display devices to which the display device belongs, and
wherein the profile module is configured to provide the selected processing profile to the data processing module.

15. The display system of claim 1, wherein the data processing module resides on a computing device distinct from and operatively coupled to the display device.

16. The display system of claim 1, wherein the data processing module resides on a computing device remote from and operatively coupled with the display device via a communication network.

17. The display system of claim 16, wherein the communication network comprises an Internet communication network.

18. The display system of claim 1, wherein the display device comprises a digital projector.

19. A method of displaying an image on a display device, the method comprising:
determining a processing profile of the display device, the processing profile including optical characteristics, imager characteristics, color characteristics, and data handling characteristics of the display device;
receiving input image data for the image to be displayed;
generating remotely from the display device processed image data from the input image data based on the processing profile; and
storing the processed image data.

20. The method of claim 19, further comprising:
transferring the stored processed image data to the display device for display of the image after generating the processed image data is complete.

21. The method of claim 19, wherein generating the processed image data includes adjusting the input image data based on the processing profile and one or more algorithms corresponding to the display device.

22. A display system, comprising:
means for displaying an image;
means for determining a processing profile of the displaying means, the processing profile including optical characteristics, imager characteristics, color characteristics, and data handling characteristics of the displaying means;
means for receiving input image data for the image to be displayed; and
means for generating processed image data from the input image data based on the processing profile, wherein the generating means is remote from the displaying means.

23. The display system of claim 22, further comprising:
means for storing the processed image data; and
means for providing the processed image data from the storing means to the displaying means for display of the image.

24. The display system of claim 22, wherein the generating means includes means for algorithmically processing the input image data based on the processing profile to from the processed image data.

25. A display system, comprising:
a display device configured to display an image and having an identifier code and a processing profile associated therewith, the processing profile including optical characteristics, imager characteristics, color characteristics, and data handling characteristics of the display device;
a profile module operatively coupled to the display device and including at least the processing profile of the display device; and
a data processing module operatively coupled to the display device and configured to receive input data for the image,
wherein the profile module is configured to select the processing profile of the display device based on the identifier code and provide the processing profile to the data processing module, and wherein the data processing module is configured to generate processed image data from the input data based on the processing profile of the display device.

26. The display system of claim 25, further comprising:
a memory, wherein the data processing module is configured to store the processed image data in the memory.

27. The display system of claim 25, wherein the data processing module is configured to generate and provide the processed image data to the display device for display of the image on a real-time basis.

28. The display system of claim 25, wherein the profile module and the data processing module reside on a common computing device.

29. The display system of claim 25, wherein the profile module and the data processing module reside on separate computing devices.

30. The display system of claim 25, further comprising:
a process update module configured to update a processing capability of the data processing module for the display device.

* * * * *

UNITED STATES PATENT AND TRADEMARK OFFICE
CERTIFICATE OF CORRECTION

PATENT NO. : 7,453,454 B2  
APPLICATION NO. : 11/259453  
DATED : November 18, 2008  
INVENTOR(S) : William J. Allen et al.

It is certified that error appears in the above-identified patent and that said Letters Patent is hereby corrected as shown below:

In column 12, line 22, in Claim 24, after "to" delete "from" and insert -- form --, therefor.

Signed and Sealed this

Fourteenth Day of April, 2009

JOHN DOLL  
*Acting Director of the United States Patent and Trademark Office*